US010364876B2

(12) United States Patent
Lee et al.

(10) Patent No.: US 10,364,876 B2
(45) Date of Patent: Jul. 30, 2019

(54) FOUR-WHEEL DRIVING APPARATUS FOR VEHICLE

(71) Applicants: Hyundai Motor Company, Seoul (KR); Kia Motors Corporation, Seoul (KR)

(72) Inventors: Sang Joon Lee, Seoul (KR); Euy Do Hu, Daejeon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/815,416

(22) Filed: Nov. 16, 2017

(65) Prior Publication Data

US 2019/0011031 A1 Jan. 10, 2019

(30) Foreign Application Priority Data

Jul. 7, 2017 (KR) .................. 10-2017-0086416

(51) Int. Cl.
*F16H 48/06* (2006.01)
*F16H 48/20* (2012.01)
*F16D 11/00* (2006.01)

(52) U.S. Cl.
CPC ............ *F16H 48/20* (2013.01); *F16H 48/06* (2013.01); *F16D 2011/004* (2013.01)

(58) Field of Classification Search
CPC ..... F16H 48/06; F16H 48/20; F16D 2011/004
USPC ........................................ 475/223
See application file for complete search history.

(56) References Cited

U.S. PATENT DOCUMENTS

| 3,895,546 | A | * | 7/1975 | Yamaguchi | ............... F16H 3/54 475/223 |
| 5,078,660 | A | * | 1/1992 | Williams | ........... B60K 17/3467 180/250 |
| 5,125,490 | A | * | 6/1992 | Suzumura | .......... B60K 23/0808 180/249 |
| 5,363,938 | A | * | 11/1994 | Wilson | ................... B60K 23/08 180/233 |
| 5,545,103 | A | * | 8/1996 | Gustin | ............... B60K 17/3462 180/249 |

(Continued)

FOREIGN PATENT DOCUMENTS

| JP | 1994-075856 U | 10/1994 |
| JP | 4248838 B2 | 4/2009 |

(Continued)

*Primary Examiner* — Leslie A Nicholson, III
(74) *Attorney, Agent, or Firm* — Morgan, Lewis & Bockius LLP

(57) ABSTRACT

A four-wheel driving apparatus for a vehicle may include a planetary gear set including a sun gear, a carrier, and a ring gear, and provided so that the sun gear is coupled to a transmission output shaft; a counter shaft provided in parallel to the transmission output shaft; a sleeve included in the counter shaft, receiving operating force of a shift fork to slide along a longitudinal direction of the counter shaft, and provided to be selectively coupled to any one of the sun gear and the carrier of the planetary gear set according to a sliding position; a center differential connected to a front differential through a front output shaft and connected to a rear differential through a rear output shaft; and a transfer gear device disposed to connect between the counter shaft and any one of the front output shaft and the rear output shaft.

9 Claims, 4 Drawing Sheets

(56) References Cited

U.S. PATENT DOCUMENTS

| | | | | |
|---|---|---|---|---|
| 5,704,863 | A * | 1/1998 | Zalewski | B60K 17/344 |
| | | | | 180/247 |
| 6,386,308 | B1 * | 5/2002 | Takahira | B60T 8/175 |
| | | | | 180/197 |
| 6,629,474 | B2 * | 10/2003 | Williams | B60K 23/08 |
| | | | | 180/248 |
| 6,634,978 | B2 * | 10/2003 | Banno | B60K 17/3462 |
| | | | | 180/247 |
| 6,709,357 | B2 * | 3/2004 | Schleuder | F16H 57/021 |
| | | | | 475/223 |
| 6,805,652 | B2 * | 10/2004 | Williams | B60K 23/08 |
| | | | | 180/249 |
| 6,862,953 | B2 * | 3/2005 | Fitzgerald | B60K 23/08 |
| | | | | 180/248 |
| 7,278,946 | B2 * | 10/2007 | Williams | B60K 23/08 |
| | | | | 192/38 |
| 8,403,795 | B2 * | 3/2013 | Ekonen | B60K 25/06 |
| | | | | 475/204 |
| 8,975,126 | B2 * | 3/2015 | Chen | H01L 29/66757 |
| | | | | 438/166 |

FOREIGN PATENT DOCUMENTS

| | | |
|---|---|---|
| JP | 2016-187981 A | 11/2016 |
| KR | 10-2003-0033792 A | 5/2003 |

* cited by examiner (High Speed Mode)

(Low Speed Mode)

FOUR-WHEEL DRIVING APPARATUS FOR VEHICLE

CROSS REFERENCE TO RELATED APPLICATION

The present application claims priority to Korean Patent Application No. 10-2017-0086416 filed on Jul. 7, 2017, the entire contents of which is incorporated herein for all purposes by the present reference.

BACKGROUND OF THE INVENTION

Field of the Invention

The present invention relates to a four-wheel driving apparatus for a vehicle suitable for a truck, a military tactical vehicle, a felling vehicle, an agricultural vehicle, or the like that drives on a rough road, and prevents a dragging by a rotation difference between a front wheel and a rear wheel.

Description of Related Art

In general, a differential gearing is an apparatus that allows wheels to smoothly rotate without slipping by rotating an external wheel faster than an internal wheel according to resistances of the external and internal wheels when a vehicle turns on a curve road.

However, when one wheel falls into a slough, such a differential apparatus causes all of the power to pass through the wheel in the slough and prevents the power from being transferred to the wheels grounded on the road, causing the vehicle to fail to escape from the slough.

A limited slip differential gear is an apparatus that limits the differential when the vehicle drives on a rough road or the like, distributing the power to not only the wheel with low resistance but also the wheel with high resistance to enable the vehicle to drive.

Representative examples of the limited slip differential gear according to the related art may include a limited slip differential (LSD) and a no-spin differential (NSD).

The information disclosed in this Background of the Invention section is only for enhancement of understanding of the general background of the invention and may not be taken as an acknowledgement or any form of suggestion that this information forms the related art already known to a person skilled in the art.

BRIEF SUMMARY

Various aspects of the present invention are directed to providing a four-wheel driving apparatus for a vehicle configured for preventing an occurrence of unreasonable load in a transmission when the vehicle is towed by applying an intermediate transmission that implements a neutral mode, while preventing an occurrence of a torsion phenomenon by a rotation difference between a front wheel and a rear wheel.

According to an exemplary embodiment of the present invention, there is provided a four-wheel driving apparatus for a vehicle including: a planetary gear set including a sun gear, a carrier, and a ring gear, and provided so that the sun gear is coupled to a transmission output shaft; a counter shaft provided in parallel to the transmission output shaft; a sleeve included in the counter shaft, receiving operating force of a shift fork to slide along a longitudinal direction of the counter shaft, and provided to be selectively coupled to any one of the sun gear and the carrier of the planetary gear set according to a sliding position; a center differential connected to a front differential through a front output shaft and connected to a rear differential through a rear output shaft; and a transfer gear device disposed to connect between the counter shaft and any one of the front output shaft and the rear output shaft.

The sun gear of the planetary gear set may have one side coupled to the transmission output shaft and the other side in which an insertion groove is formed, and may be provided so that the counter shaft is inserted.

One end portion of the counter shaft may be fixed into the insertion groove of the sun gear of the planetary gear set by a bearing, and the other end portion thereof may be rotatably fixed to a housing.

One end portion of the sleeve may be provided with a connection portion which is selectively connectable to an internal circumferential surface of the sun gear or the carrier of the planetary gear set, and the other end portion thereof may be provided with an insertion portion having an external circumferential surface coupled to the shift fork to receive operating force.

An internal circumferential surface of one side of the carrier may be formed to be greater than an external diameter of the connection portion and an internal circumferential surface of the other side thereof may be formed to have the same size as the internal circumferential surface of the sun gear and the connection portion, and the connection portion of the sleeve may be provided so that an external circumferential surface thereof is engaged with the sun gear or the carrier of the planetary gear set.

When a driving mode of the vehicle is a high speed mode, the shift fork may be operated so that the connection portion of the sleeve is coupled to the sun gear of the planetary gear set.

When a driving mode of the vehicle is a low speed mode, the shift fork may be operated so that the connection portion of the sleeve is coupled to the carrier of the planetary gear set.

When the vehicle is in a neutral state, the shift fork may apply operating force to the sleeve so that the connection portion of the sleeve is not coupled to the sun gear or the carrier of the planetary gear set.

The center differential may be provided as a no slip differential (NSD).

The transfer gear device may include a driving gear provided in the counter shaft, a counter gear provided on a connection shaft disposed to be in parallel to the counter shaft, and a driven gear provided on the front output shaft or the rear output shaft.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
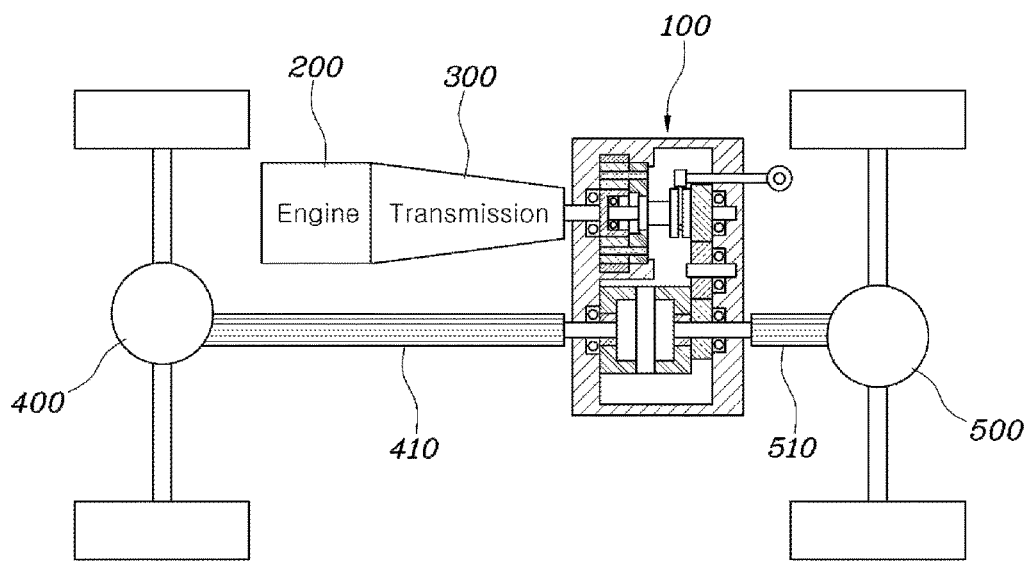
FIG. 1 is a view illustrating a four-wheel driving apparatus for a vehicle according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a four-wheel driving apparatus for a vehicle according to exemplary embodiments of the present invention will be described with reference to the accompanying drawings.

Figure 2:
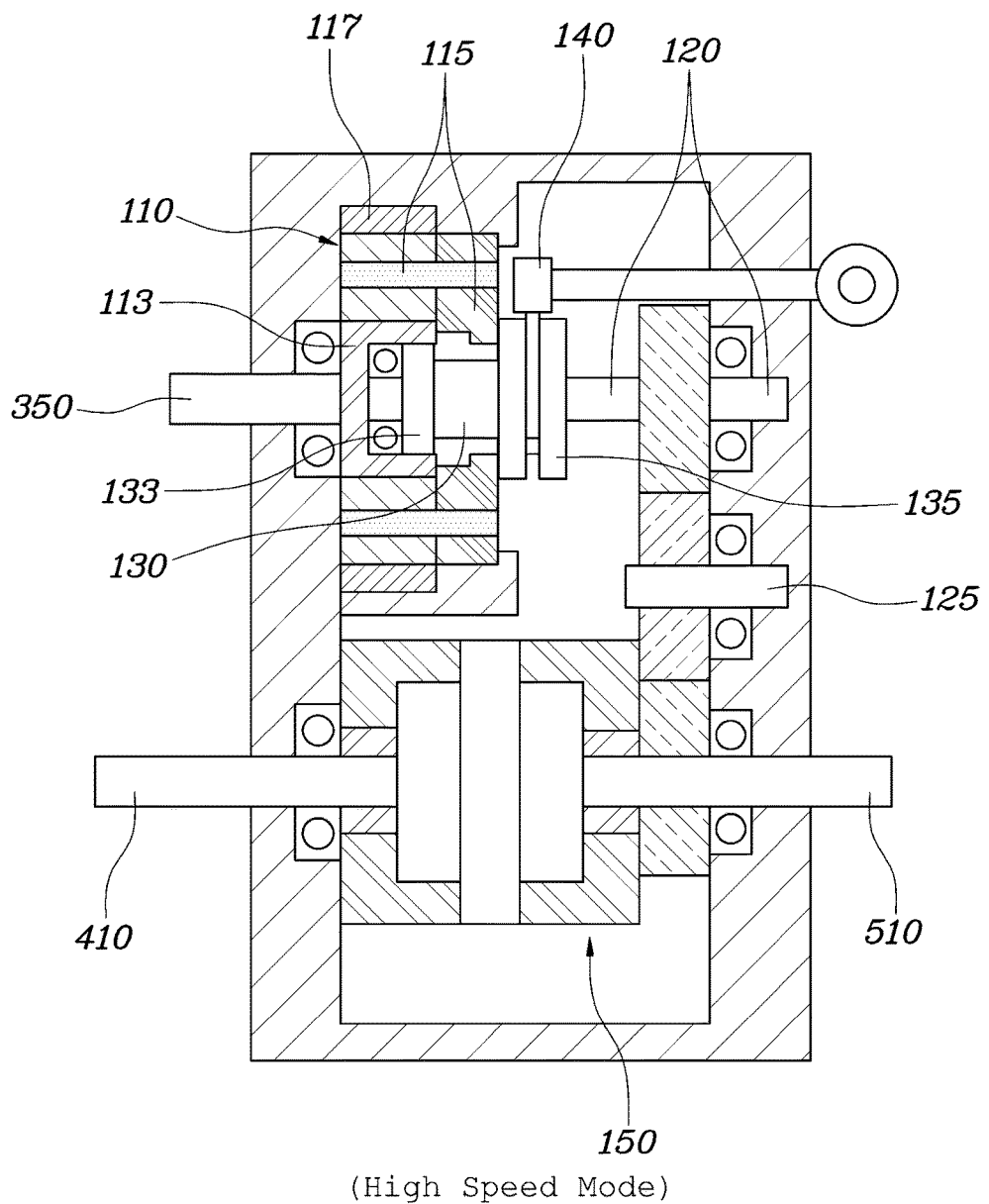
FIG. 2 is a view illustrating an operation of the four-wheel driving apparatus for the vehicle when being driven in a high speed mode, according to an exemplary embodiment of the present invention.
Figure 3:
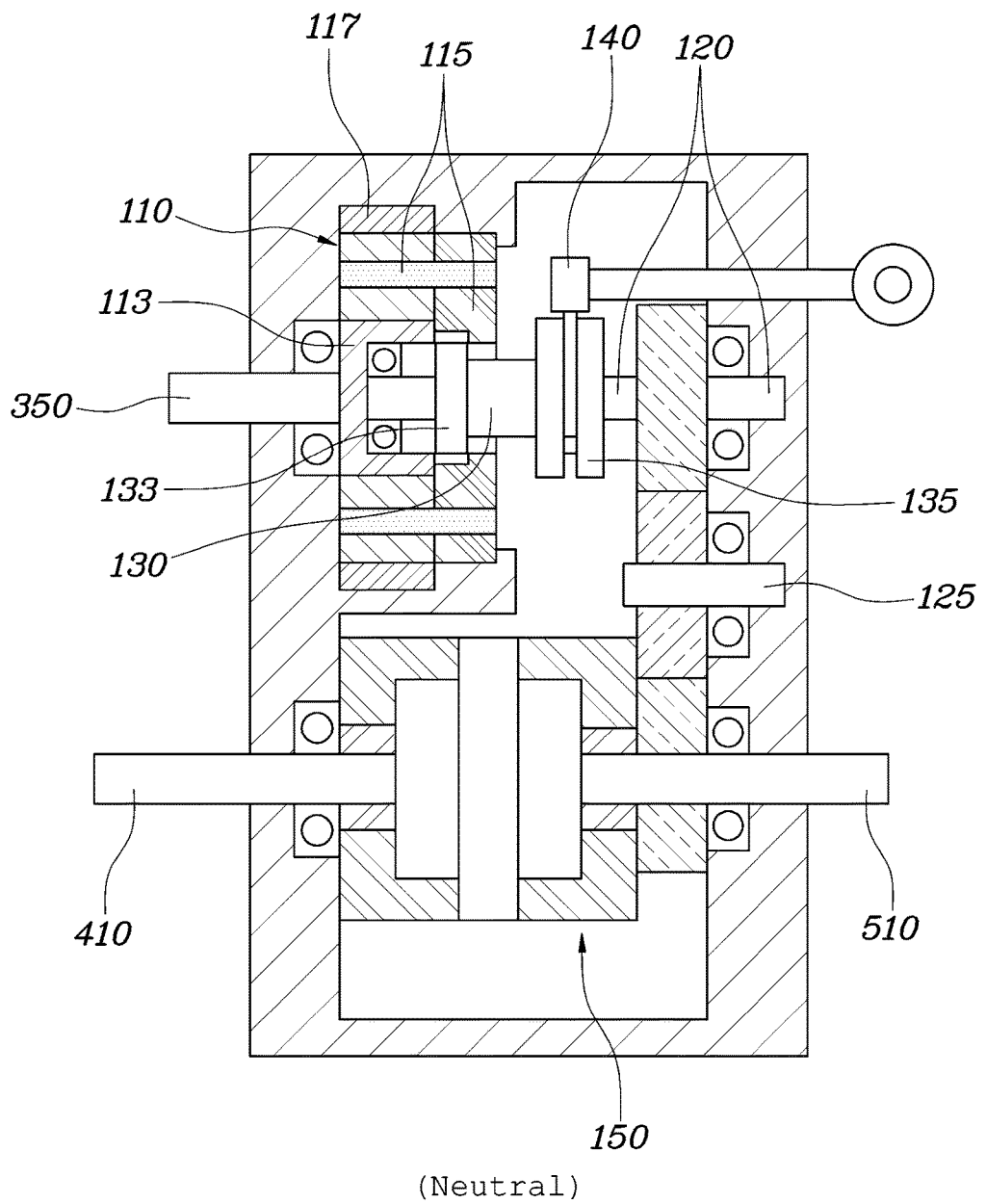
FIG. 3 is a view illustrating an operation of the four-wheel driving apparatus for the vehicle when being driven in a neutral mode, according to an exemplary embodiment of the present invention.
Figure 4:
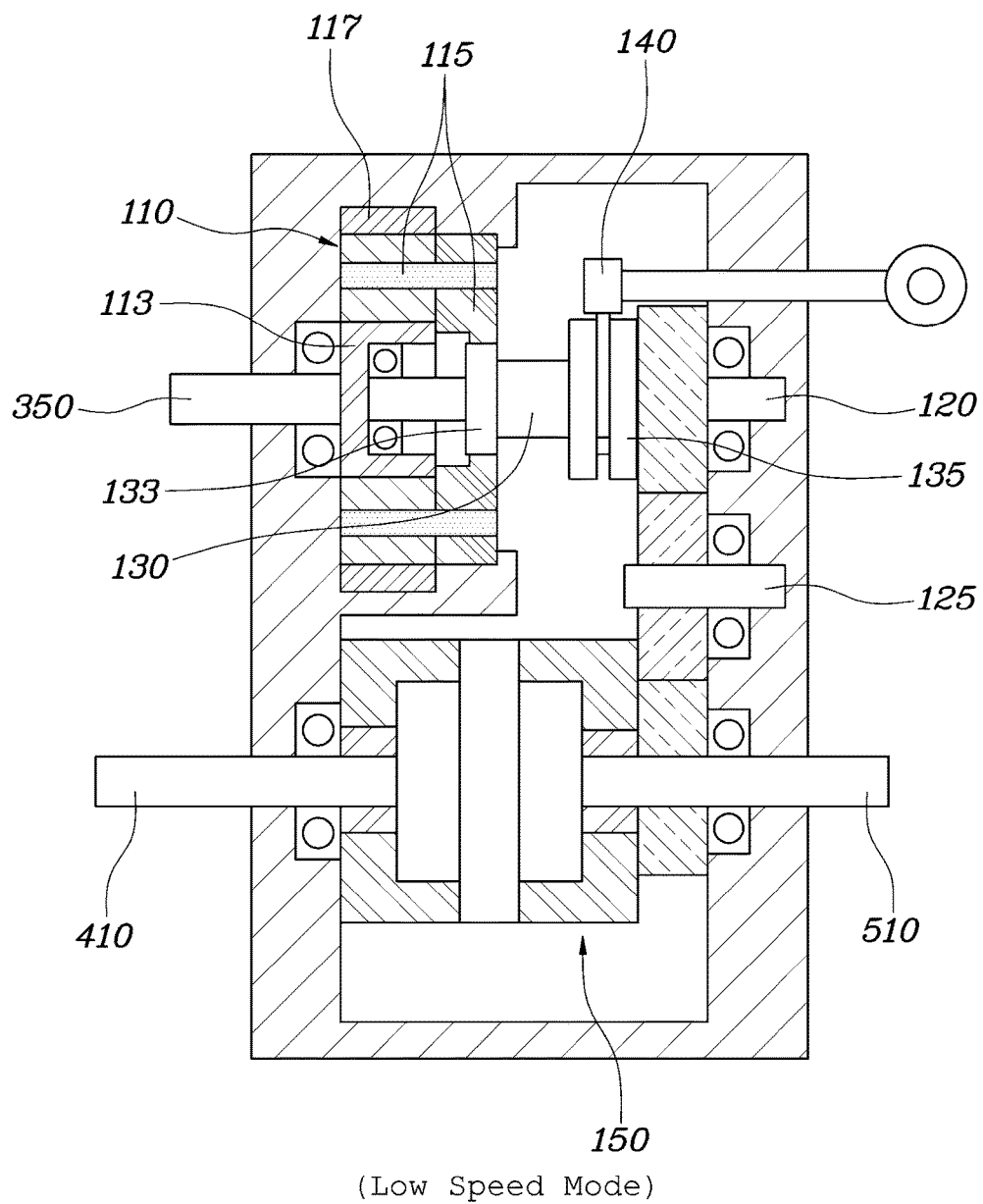
FIG. 4 is a view illustrating an operation of the four-wheel driving apparatus for the vehicle when being driven in a low speed mode, according to an exemplary embodiment of the present invention.

FIG. 1 is a view illustrating a four-wheel driving apparatus for a vehicle according to an exemplary embodiment of the present invention, FIG. 2 is a view illustrating an operation of the four-wheel driving apparatus for the vehicle when being driven in a high speed mode, according to an exemplary embodiment of the present invention, FIG. 3 is a view illustrating an operation of the four-wheel driving apparatus for the vehicle when being driven in a neutral mode, according to an exemplary embodiment of the present invention, and FIG. 4 is a view illustrating an operation of the four-wheel driving apparatus for the vehicle when being driven in a low speed mode, according to an exemplary embodiment of the present invention.

Referring to FIG. 1, FIG. 2, FIG. 3 and FIG. 4, a four-wheel driving apparatus for a vehicle according to an exemplary embodiment of the present invention may include a planetary gear set 110 including a sun gear 113, a carrier 115, and a ring gear 117, and provided so that the sun gear 113 is coupled to a transmission output shaft 350; a counter shaft 120 provided in parallel to the transmission output shaft 350; a sleeve 130 included in the counter shaft 120, receiving operating force of a shift fork 140 to slide along a longitudinal direction of the counter shaft 120, and provided to be selectively coupled to any one of the sun gear 113 and the carrier 115 of the planetary gear set 110 according to a sliding position; a center differential 150 connected to a front differential 400 through a front output shaft 410 and connected to a rear differential 500 through a rear output shaft 510; and a transfer gear device disposed to connect between the counter shaft 120 and any one of the front output shaft 410 and the rear output shaft 510.

In other words, the four-wheel driving apparatus according to an exemplary embodiment of the present invention including the center differential 150 on a shaft connecting between the front differential 400 provided between front wheels and the rear differential 500 provided between rear wheels is provided, preventing a tire dragging phenomenon or a deterioration phenomenon in vehicle durability life due to torsion generated due to a rotation difference between the front output shaft 410 and the rear output shaft 510.

Here, the four-wheel driving apparatus for the vehicle according to an exemplary embodiment of the present invention is connected to the transmission output shaft 350 to receive power of the engine 200 and transfers the power received from the transmission output shaft 350 to the center differential 150 through the planetary gear set 110, making it possible to transfer driving force of the engine 200 or a motor 300 to a wheel side as it is, or to transfer decelerated driving force to the wheel side.

Furthermore, according to an exemplary embodiment of the present invention, any one of the front output shaft 410 and the rear output shaft 510 connected to the center differential 150 is connected to the counter shaft 120 through the transfer gear device, and the sleeve 130 is provided to selectively connect between the counter shaft 120 and the planetary gear set 110.

The sleeve 130 is constantly engaged on the counter shaft 120, but is provided to be slidable along a longitudinal direction of the counter shaft 120 and is provided so that the shift fork 140 operates a sliding position of the sleeve 130.

Here, the shift fork 140 may also be provided to be moved directly by a physical operation of a passenger, and may also be provided to be connected to a separate actuator to be slidably moved by controlling a driving amount of the actuator according to a switch operation of the passenger.

Therefore, since the sleeve 130 releases the connection between the planetary gear set 110 and the counter shaft 120 in the neutral state, it is possible to prevent components of the transmission from being damaged or broken due to excessive rotational force transferred to the transmission 300 through the wheels when the vehicle is towed.

The sun gear 113 of the planetary gear set 110 has one side coupled to the transmission output shaft 350 and the other side in which an insertion groove is formed, and may be provided so that the counter shaft 120 is inserted thereto.

That is, the sun gear 113 of the planetary gear set 110 is provided to receive the power of the engine 200 through the transmission output shaft 350, and the counter shaft 120 is selectively connectable to the planetary gear set 110 and needs to be provided at a position adjacent to the planetary gear set 110 to receive the power.

Therefore, the counter shaft 120 is provided in a state in which it is inserted into the insertion groove of the sun gear 113 of the planetary gear set 110, such that the counter shaft 120 may be provided to the position adjacent to the planetary gear set 110 while being provided to be in parallel to the transmission output shaft 350.

Here, one end portion of the counter shaft 120 may be fixed into the insertion groove of the sun gear 113 of the planetary gear set 110 by a bearing, and the other end portion thereof may be rotatably fixed to a housing.

That is, the counter shaft 120 needs to be inserted and fixed into the insertion groove of the sun gear 113 while being freely rotated separately from the planetary gear set 110. Therefore, the counter shaft 120 may be provided to be fixed into the insertion groove through the bearing.

Furthermore, the four-wheel driving apparatus for the vehicle according to an exemplary embodiment of the present invention is provided to enclose the planetary gear set 110, the counter shaft 120, the sleeve 130, the shift fork 140, and the center differential 150 with the housing, and since the other end portion of the counter shaft 120 also needs to be fixed, it may be fixedly connected to the housing through bearing. Here, the transmission output shaft 350, the front output shaft 410, and the rear output shaft 510 may be connected to internal components while penetrating through the housing.

Meanwhile, one end portion of the sleeve 130 may be provided with a connection portion 133 which is selectively connectable to an internal circumferential surface of the carrier 115 or the sun gear 113 of the planetary gear set 110, and the other end portion thereof may be provided with an insertion portion 135 having an external circumferential surface coupled to the shift fork 140 to receive operating force.

That is, according to an exemplary embodiment of the present invention, the sleeve 130 may include a portion coupled to the sun gear 113 or the carrier 115 of the planetary gear set 110 and a portion receiving the operating force from the shift fork 140 to be slidably moved.

Here, an internal circumferential surface of one side of the carrier 115 is formed to be greater than an external diameter of the connection portion 133, an internal circumferential surface of the other side thereof is formed to have the same size as the internal circumferential surface of the sun gear 113 and the connection portion 133, and the connection portion 133 of the sleeve 130 may be provided so that an external circumferential surface thereof is engaged with the sun gear 113 or the carrier 115 of the planetary gear set 110.

That is, the internal circumferential surface of the sun gear 113 of the planetary gear set 110 and the internal circumferential surface of the other side of the carrier 115 are machined to be engaged with the external circumferential surface of the sleeve 130, so that the sleeve 130 may receive the power from the sun gear 113 or the carrier 115 of the planetary gear set 110 according to a movement position on the counter shaft 120.

Meanwhile, the internal circumferential surface of one side of the carrier 115 is formed to be greater than the external diameter of the connection portion 133, and when the connection portion 133 slides to face the internal circumferential surface of one side of the carrier 115, the planetary gear set 110 and the counter shaft 120 are separated from each other and rotate freely. A detailed description thereof will be provided below.

In the four-wheel driving apparatus for the vehicle according to an exemplary embodiment of the present invention, when a driving mode of the vehicle is a high speed mode, the shift fork 140 is operated so that the connection portion 133 of the sleeve 130 is coupled to the sun gear 113 of the planetary gear set 110.

As illustrated in FIG. 2, the sleeve 130 is slidably moved to be engaged with an internal circumferential surface of the insertion groove of the sun gear 113, transferring the power transferred from the transmission output shaft 350 to any one of the front output shaft 410 and the rear output shaft 510 through the sun gear 113, the sleeve 130, the counter shaft 120, and the transfer gear device.

Therefore, a rotation speed of the transmission output shaft 350 is transferred to the output shaft at a ratio of 1:1, making it possible to implement a high speed driving mode of the vehicle.

When the vehicle is in a neutral state, the shift fork 140 may apply operating force to the sleeve 130 so that the connection portion 133 of the sleeve 130 is not coupled to the sun gear 113 or the carrier 115 of the planetary gear set 110.

Since the internal circumferential surface of one side of the carrier 115 is formed to be greater than the external diameter of the connection portion 133 of the sleeve 130, when the connection portion 133 of the sleeve 130 is slidably moved to face the internal circumferential surface of one side of the carrier 115 as illustrated in FIG. 3, the counter shaft 120 rotates freely from the planetary gear set 110, so the power is not transferred.

Therefore, when the vehicle is towed in the neutral state, it is possible to prevent the transmission 300 from being broken or damaged by an occurrence of unreasonable load in the transmission 300 by blocking the rotational force transferred from the wheel from being transferred to the transmission 300.

Furthermore, when the driving mode of the vehicle is a low speed mode, the shift fork 140 may be operated so that the connection portion 133 of the sleeve 130 is coupled to the carrier 115 of the planetary gear set 110.

That is, as illustrated in FIG. 4, the connection portion 133 of the sleeve 130 is slidably moved to be engaged with an internal circumferential surface of the other side of the carrier 115, transferring the power transferred from the transmission output shaft 350 in the order of the sun gear 113, the carrier 115, the sleeve 130, the counter shaft 120, the transfer gear device, and the front output shaft 410 or the rear output shaft 510, so that the power may be decelerated through the planetary gear set 110.

Accordingly, when the vehicle is driven in the low speed mode, the power of the vehicle is decelerated and the vehicle may be driven with stronger torque, making it possible to induce the vehicle to smoothly drive on a rough road.

Meanwhile, the center differential 150 may be provided as a no slip differential (NSD), and the transfer gear device may include a driving gear provided in the counter shaft 120, a counter gear provided on the connection shaft 125 disposed to be in parallel to the counter shaft 120, and a driven gear provided on the front output shaft 410 or the rear output shaft 510.

That is, the transfer gear device includes three gears to maintain a rotation direction as it is, and the housing may be fixedly provided with the connection shaft 125 to be freely rotated so that a gear transferring intermediate power may be fixed.

According to the exemplary embodiment as described above, since the four-wheel driving apparatus for the vehicle includes the intermediate transmission that implements the neutral mode in the transmission, it is possible to prevent the transmission from being damaged due to the excessive rotational force transferred to the transmission when the vehicle is towed.

Furthermore, since the NSD is applied to the intermediate transmission, it is possible to prevent the occurrence of the torsion phenomenon by the rotation difference between the front axle and the rear axle.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A four-wheel driving apparatus for a vehicle, the four-wheel driving apparatus comprising:
   a planetary gear set including a sun gear, a carrier, and a ring gear, and provided so that the sun gear is coupled to a transmission output shaft;
   a counter shaft provided in parallel to the transmission output shaft;
   a sleeve included in the counter shaft, receiving operating force of a shift fork to slide along a longitudinal direction of the counter shaft, and provided to be selectively coupled to one of the sun gear and the carrier of the planetary gear set according to a sliding position;
   a center differential connected to a front differential through a front output shaft directly coupled to the center differential and connected to a rear differential through a rear output shaft directly coupled to the center differential; and
   a transfer gear device disposed to connect between the counter shaft and one of the front output shaft and the rear output shaft,
   wherein the center differential is provided as a no slip differential (NSD), in which the center differential is connected with the counter shaft through the transfer gear device.

2. The four-wheel driving apparatus of claim 1, wherein the sun gear of the planetary gear set has a first side coupled to the transmission output shaft and a second side in which an insertion groove is formed, and is provided so that the counter shaft is inserted.

3. The four-wheel driving apparatus of claim 2, wherein a first end portion of the counter shaft is fixed into the insertion groove of the sun gear of the planetary gear set by a bearing, and a second end portion thereof is rotatably fixed to a housing.

4. The four-wheel driving apparatus of claim 1, wherein a first end portion of the sleeve is provided with a connection portion which is selectively connectable to an internal circumferential surface of the sun gear or the carrier of the planetary gear set, and a second end portion thereof is provided with an insertion portion having an external circumferential surface coupled to the shift fork to receive the operating force.

5. The four-wheel driving apparatus of claim 4, wherein an internal circumferential surface of a first side of the carrier is formed to be greater than an external diameter of the connection portion and an internal circumferential surface of a second side thereof is formed to have a same size as the internal circumferential surface of the sun gear and the connection portion, and
   the connection portion of the sleeve is provided so that an external circumferential surface thereof is engaged with the sun gear or the carrier of the planetary gear set.

6. The four-wheel driving apparatus of claim 4, wherein, when a driving mode of the vehicle is a high speed mode, the shift fork is operated so that the connection portion of the sleeve is coupled to the sun gear of the planetary gear set.

7. The four-wheel driving apparatus of claim 4, wherein, when a driving mode of the vehicle is a low speed mode in which the vehicle has a speed lower than a predetermined amount, the shift fork is operated so that the connection portion of the sleeve is coupled to the carrier of the planetary gear set.

8. The four-wheel driving apparatus of claim 4, wherein, when the vehicle is in a neutral state, the shift fork applies the operating force to the sleeve so that the connection portion of the sleeve is not coupled to the sun gear or the carrier of the planetary gear set.

9. The four-wheel driving apparatus of claim 1, wherein the transfer gear device includes a driving gear provided in the counter shaft, a counter gear provided on a connection shaft disposed to be in parallel to the counter shaft, and a driven gear provided on the front output shaft or the rear output shaft.

* * * * *